June 29, 1937. R. W. BAILY 2,084,983
APPARATUS FOR KNEADING AND WORKING PLASTIC MATERIAL
Filed Sept. 5, 1933 2 Sheets-Sheet 1
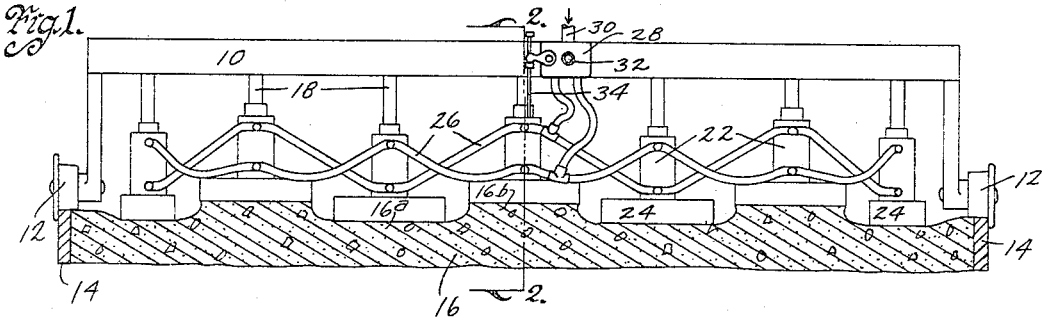

June 29, 1937.   R. W. BAILY   2,084,983
APPARATUS FOR KNEADING AND WORKING PLASTIC MATERIAL
Filed Sept. 5, 1933   2 Sheets-Sheet 2
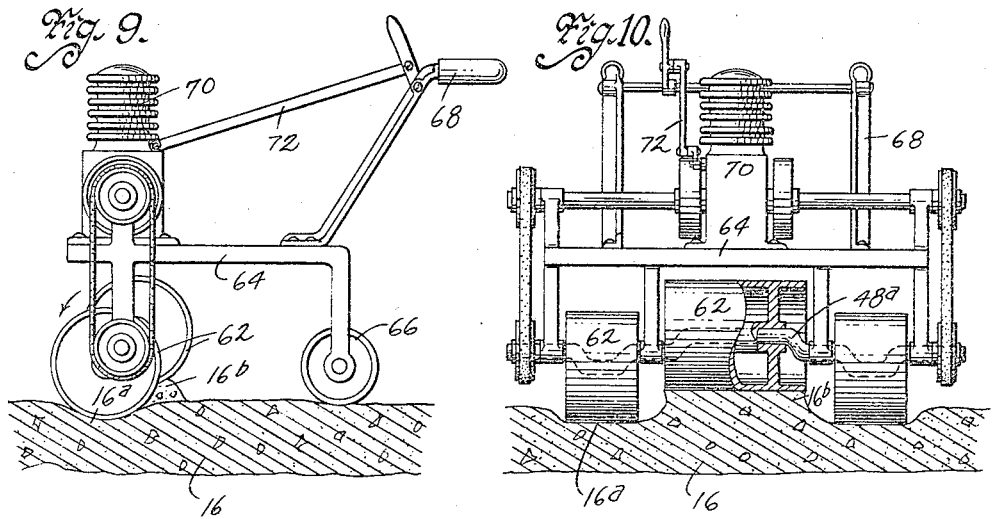
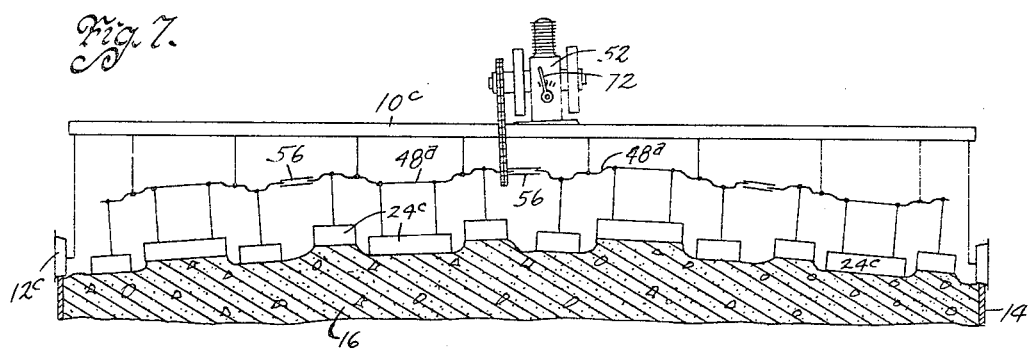
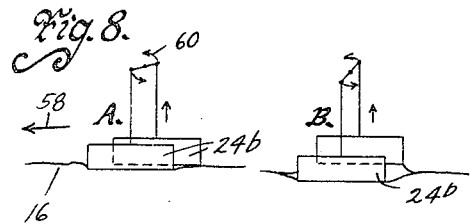
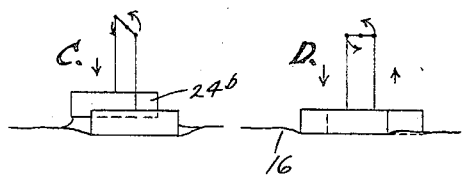
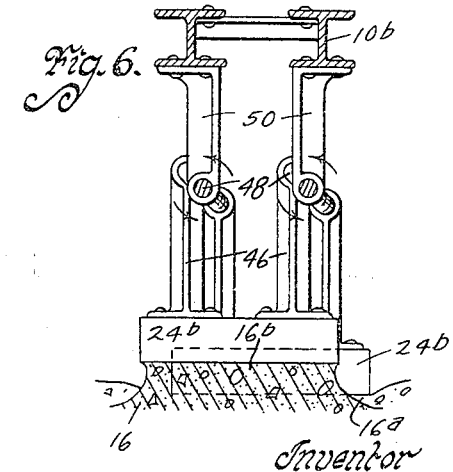
Inventor
Robert W. Baily
by Bair, Freeman & Sinclair
Attorneys
Witness
Edw. Selby Patented June 29, 1937

2,084,983

UNITED STATES PATENT OFFICE 2,084,983

APPARATUS FOR KNEADING AND WORKING PLASTIC MATERIAL

Robert William Baily, Philadelphia, Pa.

Application September 5, 1933, Serial No. 688,172

19 Claims. (Cl. 94—45)

An object of my present invention is to provide a method and apparatus for kneading and working plastic materials such as concrete, and an apparatus of simple and inexpensive construction for practicing the process.

A further object is to provide a method for kneading and working plastic material comprising applying to the surface thereof pads or working elements arranged adjacent each other and operating them in opposite directions so that one travels toward the mass of plastic material while the other travels away therefrom, causing the first one to press into the material and the second one to withdraw the material by adhesion and vacuum, thus causing lateral displacement of the portion of the mass under the first working element toward the second one, their movements then being reversed for reversing the displacement, and this process being cyclically repeated for thoroughly working the mass of plastic material and causing the cementitious portion thereof to be thoroughly intermingled with the finer granular material and the resultant mixture to thoroughly fill the interstices between the coarser granular material while at the same time the material is rendered homogeneous, dense and free from voids by reason of the working process being performed.

A further object is to provide an apparatus consisting of at least a pair of adjacent working elements with means for moving them in alternately opposite directions, or in the case of a plurality of elements, in any number of different directions, for causing alternate pressure and relief of pressure of the elements on the plastic material and thus thoroughly working it to drive out entrained air and densify it, thus producing a concrete slab, for instance, which has the maximum strength for its thickness.

A further object is to provide the opposed working elements, each with all its apparatus being of substantially equal weight so that they are in a state of equilibrium at all positions of operation, thus to reduce oscillation of the supporting structure and power means due to the operation of the working elements.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a diagrammatic, front elevation of a kneading and working apparatus for plastic material embodying my invention.

Figure 2 is a vertical, sectional view on the line 2—2 of Figure 1.

Figure 3 is a similar, sectional view showing a modified form.

Figure 4 is a view similar to Figure 1 showing an engine driven apparatus rather than one driven by compressed air or the like.

Figure 5 is a partial plan view of Figure 4 on the line 5—5.

Figure 6 is a sectional view on the line 6—6 of Figure 4.

Figure 7 is a diagrammatic, front elevation showing an arrangement similar to Figure 4, but providing for a crowned concrete slab rather than a flat one.

Figure 8 shows diagrammatically successive positions of the kneading elements in Figure 6.

Figure 9 is a side elevation of a modified form of apparatus having rollers rather than pad-like kneading elements.

Figure 10 is a front elevation of Figure 9.

On the accompanying drawings I have used the reference numeral 10 to indicate a carriage. It is supported by wheels 12 adapted to ride on curbs 14 or other forms at the side of a concrete slab 16. The concrete slab 16 may be composed of coarse granular material, such as crushed rock, fine granular material, such as gravel or sand, and a cementitious binder, all of which is reduced to a plastic form by the addition of water in the ordinary manner.

Such a mixture becomes plastic under manipulation, even when mixed comparatively dry and my apparatus is adapted for such manipulation of the plastic material so that it becomes dense, and thereby conditions it for maximum strength.

The carriage 10 supports piston rods 18 having pistons 20. Cylinders 22 surround the pistons 20. Kneading elements 24 of pad or plank-like character are secured to the lower ends of the cylinders 22.

By means of hose connections 26, compressed air or other operating fluid can be introduced into or exhausted from the cylinder 22 above and below the piston 20. I have illustrated a control valve 28 and it will be noted that the hoses 26 are connected therewith, a supply pipe or hose being connected at 30 to the valve 28 and an exhaust being illustrated at 32. The control valve 28 is adapted to be operated by a rod 34 extending from one of the cylinders 22 so that, first, air is supplied to one hose 26 and exhausted from the other one, causing the cylinder 22 to move in one direction and then the movement of the cylinder reverses the valve and the direction of air with respect to the hoses 26 is reversed causing a reversal of the cylinder 22 and a consequent return of the valve 28 to initial position. The parts are then in position for the operating cycle of the cylinder 22 and its kneading element 24 to be repeated.

It will be noted that the hoses 26 extend from the bottom of one cylinder 22 to the top of the next one and so on, so as to cause any two of the kneading elements adjacent each other to simultaneously move in opposite directions. The movement of the kneading elements (the lower surfaces of which have a mean elevation substantially at the average contour of the slab 16) causes depressions as at 16a and projections as at 16b which alternately exchange with each other during the operation of the apparatus and during the exchange causes lateral displacement of the projected material toward the depressed material, thus thoroughly working the mass of concrete in the desired manner.

I have illustrated three of the elements raised and four of them lowered. Two of the lowered ones, however, are smaller and in fact the weight of each equals half the weight of the larger ones so that the combined weight of the three raised elements is equal to the combined weight of the four lowered elements. This produces a state of equilibrium which minimizes the transmission of impulses from the kneading elements to the carriage 10.

In Figure 3 I have shown a modified construction in which kneading elements 24a are carried by piston rods 36 and 38 respectively, a yoke connection 40 being provided between the kneading elements and the piston rod 38. The piston rods have pistons 42 in a cylinder 44 and operable to move away from each other when air is introduced, or to move toward each other when air is exhausted from therebetween. Suitable valve mechanism is provided for introducing and exhausting air periodically for producing alternately opposite movements of the center element 24a and the elements 24a on each side thereof.

The weight of the center element 24a is substantially equal to the weight of the outside elements 24a and the yoke 40, whereby they will move at the same speed in opposite directions, with the cylinder 44 supported on a carriage 10a tending to remain in its original position without oscillation being imparted to it. Any suitable means may be provided for advancing the carriage 10 or 10a at the proper speed along the slab of concrete being kneaded.

In Figure 4 I show kneading elements 24b operated by connecting rods 46 on a crank shaft 48. The cranks are arranged for opposite throw and are journalled in brackets 50 on the carriage frame 10b. An engine 52 or other power means may be used for rotating the crank shaft 48. I have also illustrated a chain connection at 54 for advancing the carriage and apparatus by using the power developed by the engine 52.

From the construction of the parts just described, it will be obvious that my apparatus for kneading and working plastic material can be worked out mechanically with crank shafts as well as pneumatically with pistons and cylinders. In each instance, the parts are balanced to prevent excessive oscillation of the carriage and to cause the downward pull exerted by upwardly moving kneading elements to be counteracted by the upward push of downwardly moving kneading elements.

In order to keep the kneading elements 24b in a level position, two of the crank shafts 48 are provided as shown in Figures 5 and 6. These are connected for synchronous rotation by a chain 55. Although they are illustrated as two throw crank shafts, use of more throws may be provided as equilibrium can still be maintained if the throws are distributed equally circumferentially of the crank shaft and the centrifugal forces of the weights of the various kneading elements and their apparatus are in balance.

In Figure 7 I illustrate how working elements 24c can be arranged to form the contour of a crowned slab 16 instead of a flat one. The kneading elements are divided into four units, each at a slightly different angle and connected by flexible connections 56.

In Figure 8 I illustrate at A, B, C and D respectively progressive positions of the kneading elements when operated by a crank shaft. It will be noted that as well as up and down movement a further motion in the direction of the arrow 58 is imparted due to the rotation of the crank shaft in the direction of the arrow 60.

This produces a lateral displacement of the portion of the plastic material 16 adhering to each kneading element, thus increasing the kneading action. The apparatus is then advanced in the direction of the arrow 58, although preferably at a slower rate than the advancement of one of the kneading elements while passing the top portion of its throw.

The advancement of the kneading elements along the slab presents some problems of frictional drag. This can be eliminated to some extent by using roller types of kneading elements. In Figures 9 and 10, I illustrate kneading elements 62 which are rollers rotatable on the crank 48a rather than non-rotating kneading elements as illustrated in Figure 4. A carriage 64 is provided with a wheel 66 and the apparatus is adapted for pushing across the slab 16, handles 68 being provided for this purpose. An engine is illustrated at 70 for rotating the crank shaft 48a.

From the construction of the apparatus shown in Figures 9 and 10, it is obvious that some hand machines, as well as comparatively wide machines to straddle the entire pavement can be made for working with pavement slabs or other slabs as desired. The apparatus shown in Figures 9 and 10 can be manipulated by an operator so that any portion of a slab desired can be worked and kneaded as required.

Some mixtures would require a greater frequency of operation for satisfactory results than others. This can be accomplished by having a means, such as a carburetor control 72 on the engine 52 or 70 to control the speed of the engine and consequently the speed of rotation of the crank shafts.

Some changes may be made in the construction and arrangement of the parts of my device without departing from the real spirit and purpose of my invention, and it is my intention to cover by my claims any modified forms of structure or use of mechanical equivalents, which may be reasonably included within their scope.

I claim as my invention:

1. In an apparatus of the class described, a carriage, power means and a crank shaft mounted thereon, a plurality of kneading elements carried by said crank shaft, freely rotatable relative to the crank pins thereof and operable by said power means to move in simultaneously opposite directions to secure maximum kneading, the total masses of said oppositely moving elements being substantially equal to cause a state of equilibrium to exist in the plurality of kneading elements during their operation and to prevent the power means and carriage from partaking in any marked degree of any of the motions of the kneading elements.

2. In an apparatus of the class described, a pair of kneading elements, the weight of one element and its appurtenances being approximately equal to the other kneading element and its appurtenances, fluid pressure operated cylinder and piston means cooperating with said kneading elements to cause alternate approach and recession of them relative to each other in a manner to prevent the cylinder and piston means from partaking of the motion of either element in order that the apparatus may remain in equilibrium, a carriage, said cylinder and piston means being supported thereby and said kneading elements being supported thereby and movable relative thereto, said elements being continuously in contact with a plastic material for working and kneading the same.

3. In a working and kneading apparatus, a plurality of kneading elements for contact with a material which becomes plastic when subjected to alternate pressure and reduction of pressure, an actuating means for moving said elements in directions toward and away from said material with insufficient amplitude to leave the surface thereof, said actuating means causing simultaneous movement of said kneading elements in opposed directions but maintaining them in a state of equilibrium whereby the actuating means is not subject to any considerable movement due to the inertia of the kneading elements, a supporting member, said actuating means being attached thereto and said kneading elements being carried thereby and movable relative thereto.

4. An apparatus comprising a pair of systems of kneading elements operable simultaneously through opposed but balanced paths of travel and arranged adjacent each other, crank shaft means for operating said kneading elements and means for supporting them relative to and in continuous contact with a surface to be kneaded, said kneading elements being arranged relative to said last means so that said last means is not rocked laterally upon operation of said apparatus.

5. In a working and kneading apparatus for plastic material, a pair of systems of kneading elements adjacent each other and arranged with one system divided and on opposite sides of the other and fluid pressure means operated cylinder and piston for moving them in opposite directions at substantially right angles to and in continuous contact with a surface to be kneaded.

6. In an apparatus of the class described, a pair of systems of kneading elements, the weight of one system and its appurtenances being approximately equal to the other system and its appurtenances, power means cooperating with said systems to cause alternate and opposed approach and recession of them relative to each other in a manner to prevent the power means from partaking of the motion of either system in order that the apparatus may remain in equilibrium one system straddling the other to aid in such equilibrium maintenance, said systems of kneading elements having horizontally arranged flat surfaces in continuous contact with a plastic material for working and kneading the same and means for advancing them along the surface of said plastic material.

7. In a working and kneading apparatus for plastic material, a pair of systems of double crank shaft mounted kneading elements adjacent to each other, one of said systems being divided and straddling the other and means for moving them in opposite directions at substantially right angles to and continuously in contact with a surface to be kneaded and for imparting lateral shearing movement to them relative to said surface during their alternate movements.

8. A plastic material working apparatus comprising kneading elements simultaneously movable through opposed but balanced paths of travel and each reciprocable only toward and from a plastic mass to be kneaded and continuously in contact therewith and means for actuating said kneading elements, at least two of said kneading elements being spaced on opposite sides of at least one other kneading element.

9. In a working and kneading apparatus for plastic material, a pair of systems of crank shaft mounted kneading elements adjacent each other and means for moving them in opposite directions at substantially right angles to a surface to be kneaded, said elements including rollers freely rotatable relative to the crank shaft.

10. In a device of the class described, a crank shaft and working and kneading rollers for plastic material mounted on the crank pins of said crank shaft for free rotation relative to said crank pins and independent of the rotation of the crank shaft.

11. In a working and kneading apparatus, a pair of elements, one for engagement with a form and the other for engagement with plastic material, a piston on one of said elements and a cylinder on the other one and means for admitting fluid pressure to said cylinder alternately on opposite sides of said piston therein.

12. In a working and kneading apparatus for plastic material, a pair of elements for engagement with the material, a piston carried by each of said elements, a single cylinder enclosing both of said pistons and means for alternately admitting fluid pressure to the space in said cylinder between said pistons and exhausting the fluid pressure therefrom.

13. In an apparatus of the class described, at least three adjacent kneading elements, the weight of two of said elements and its appurtenances being approximately equal to the weight of the third kneading element and its appurtenances, said two kneading elements being spaced on opposite sides of said third kneading element, said kneading elements being in continuous contact with plastic material for working and kneading the same, and power means cooperating with said kneading elements to cause alternate and opposite approach and recession of them relative to said plastic material whereby to secure maximum kneading thereof and in a manner to prevent the power means from partaking of the motion of either element in order that the apparatus may remain in equilibrium.

14. In an apparatus of the class described, a plurality of adjacent kneading elements, power means cooperating with each element for vertically moving at least one in one direction and at least two of the others simultaneously therewith vertically in an opposite direction and for moving said elements in alternately opposite directions, the total mass of said at least one element being approximately equal to the total mass of said at least two of the other elements to prevent said power means from partaking of any motion due to the inertia of any of said elements, said elements being superimposed upon and in continuous contact with a mass of plastic material for kneading and working the same to the maximum degree.

15. In an apparatus of the class described, kneading elements, the weight of two of said elements and its appurtenances being approximately equal to the weight of the other kneading element and its appurtenances, fluid pressure operated cylinder and piston means cooperating with said kneading elements to cause alternate approach and recession of said two elements relative to the other one in a manner to prevent the cylinder and piston means from partaking of the motion of any element in order that the apparatus may remain in equilibrium, a carriage, said cylinder and piston means being supported thereby and said kneading elements being supported thereby and movable relative thereto, said elements being in contact with plastic material for working and kneading the same.

16. In a working and kneading apparatus, at least three kneading elements for contact with a material which becomes plastic when subject to alternate pressure and reduction of pressure, an actuating means for moving two of said elements and the third element simultaneously in opposite directions, and moving all of the elements toward and away from said material, whereby the actuating means is not subject to movement due to the momentum of the kneading elements, a supporting member, said actuating means being attached thereto, and said kneading elements being carried thereby and movable relative thereto.

17. In an apparatus for working plastic material, an adjustable carriage, a crank shaft adjustably supported by said carriage, means for actuating said crank shaft, a plurality of surfaces supported by said crank shaft and arranged to make contact with said material, said crank shaft so arranged as to cause some of said surfaces to approach toward said material while other of said surfaces recede from the material, the masses of said surfaces so proportioned that their centrifugal forces with respect to the crank shaft balance out, thereby not subjecting the carriage to any considerable movement due to the motion of said surfaces.

18. In a working and kneading apparatus, an adjustable carriage, a plurality of surfaces supported by said carriage and arranged to make contact with a material, means for causing some of said surfaces to approach toward said material while other of said surfaces recede from said material, the masses of said surfaces so proportioned that their inertia with respect to each other balance out, thereby not subjecting the carriage to any considerable movement due to the motion of said surfaces.

19. In a working and kneading apparatus for plastic material, a pair of systems of crank shaft mounted kneading elements adjacent each other and means for moving said systems in opposite directions and in planes approximately perpendicular to a surface to be kneaded, said elements including surfaces freely rotatable relative to the crank shaft.

ROBERT WILLIAM BAILY.